United States Patent [19]

Bayer et al.

[11] Patent Number: 4,998,761
[45] Date of Patent: Mar. 12, 1991

[54] REINFORCED IMPACT BAR FOR A BUMPER ASSEMBLY

[75] Inventors: Dean M. Bayer; Curtis H. Harris; Bradley A. Jones, all of Anderson, Ind.

[73] Assignee: General Motors Corporation, Detroit, Mich.

[21] Appl. No.: 503,008

[22] Filed: Apr. 2, 1990

[51] Int. Cl.⁵ ............................................. B60R 19/00
[52] U.S. Cl. .................................................. 293/121
[58] Field of Search ............... 293/120, 121, 132, 133, 293/134, 135, 136

[56] References Cited

U.S. PATENT DOCUMENTS

| | | | |
|---|---|---|---|
| 3,493,257 | 2/1970 | Fitzgerald et al. | 293/71 |
| 3,884,516 | 5/1975 | Gallion et al. | 293/120 |
| 3,891,258 | 6/1975 | Barenyi | 293/98 |
| 3,938,841 | 2/1976 | Glance et al. | 293/120 |
| 4,090,728 | 5/1978 | Riedel | 293/71 R |
| 4,106,804 | 8/1978 | Scrivo | 293/63 |
| 4,111,478 | 9/1978 | Pompei et al. | 293/63 |
| 4,275,912 | 6/1981 | Bayer | 293/120 |
| 4,325,574 | 4/1982 | Umemoto et al. | 293/120 |
| 4,328,986 | 5/1982 | Weller et al. | 293/120 |
| 4,348,042 | 9/1982 | Scrivo | 293/120 |
| 4,457,547 | 7/1984 | Sekiyama et al. | 293/110 |
| 4,762,352 | 8/1988 | Enomoto | 293/120 |

*Primary Examiner*—Robert R. Song
*Attorney, Agent, or Firm*—A. Michael Tucker

[57] ABSTRACT

A bumper assembly for a vehicle includes an elongated impact bar mounted on the vehicle having inner and outer surfaces. A rib, integrally formed at a central portion of the impact bar, projects outwardly from the outer surface and extends a substantial portion of the length of the impact bar. A reinforcing member is mounted on the outer surface of the impact bar and covers a substantial portion of the length of the rib. An energy-absorbing medium is mounted on the outer surface of the impact bar and covers a substantial portion of the lengths of the reinforcing member and the ribs. A fascia is attached to the vehicle and covers the energy-absorbing medium.

5 Claims, 2 Drawing Sheets

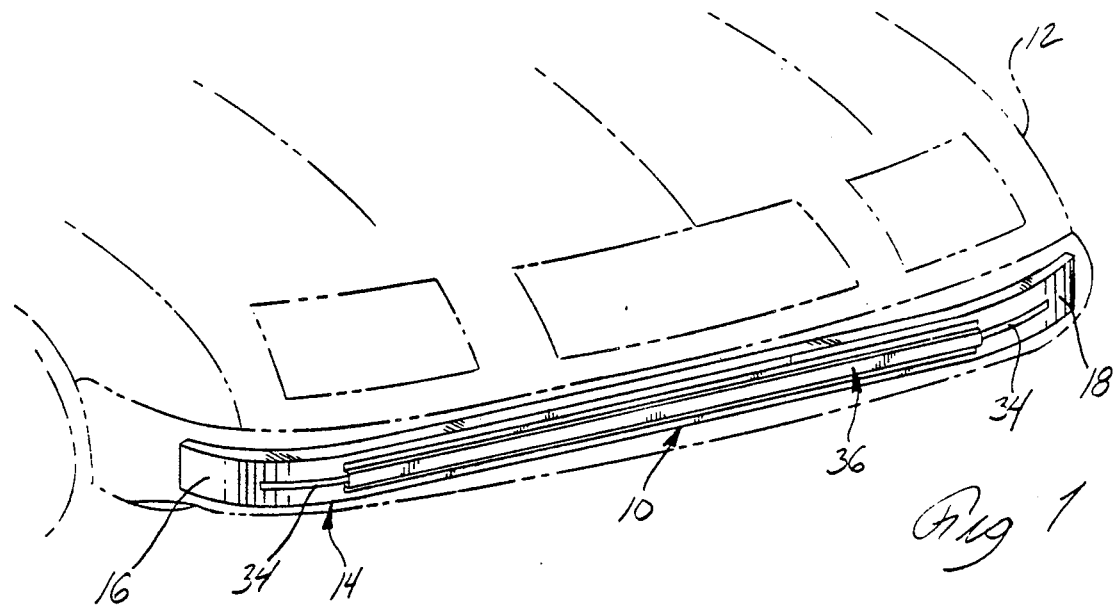
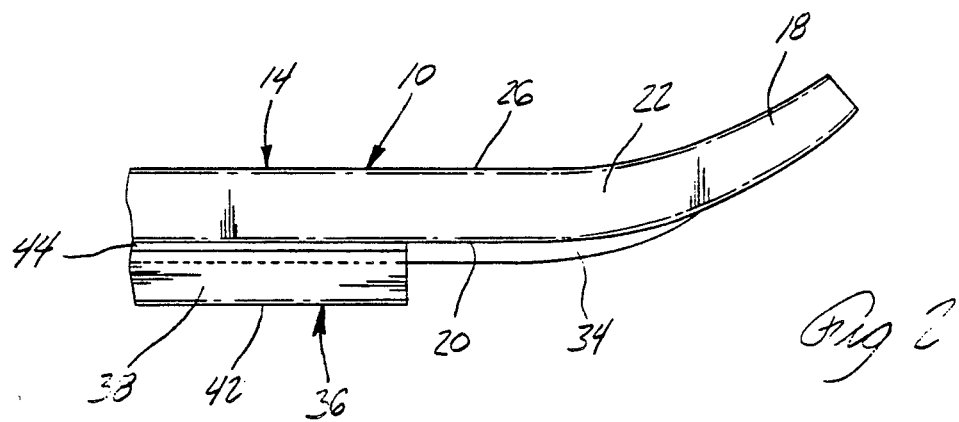
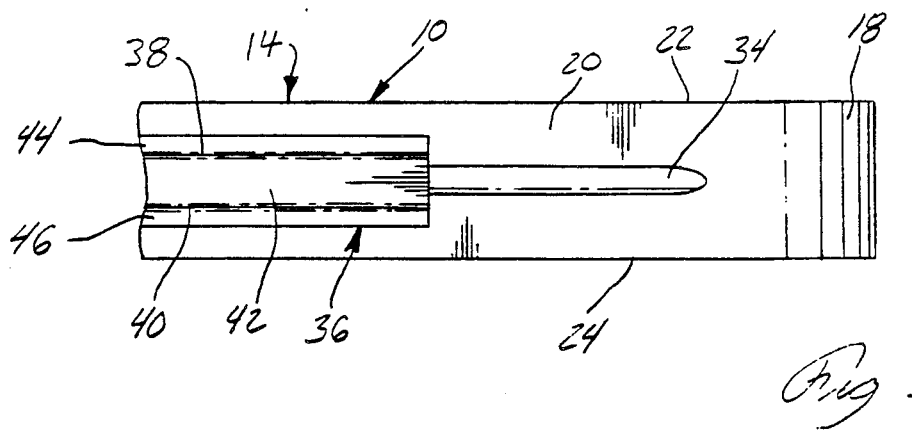

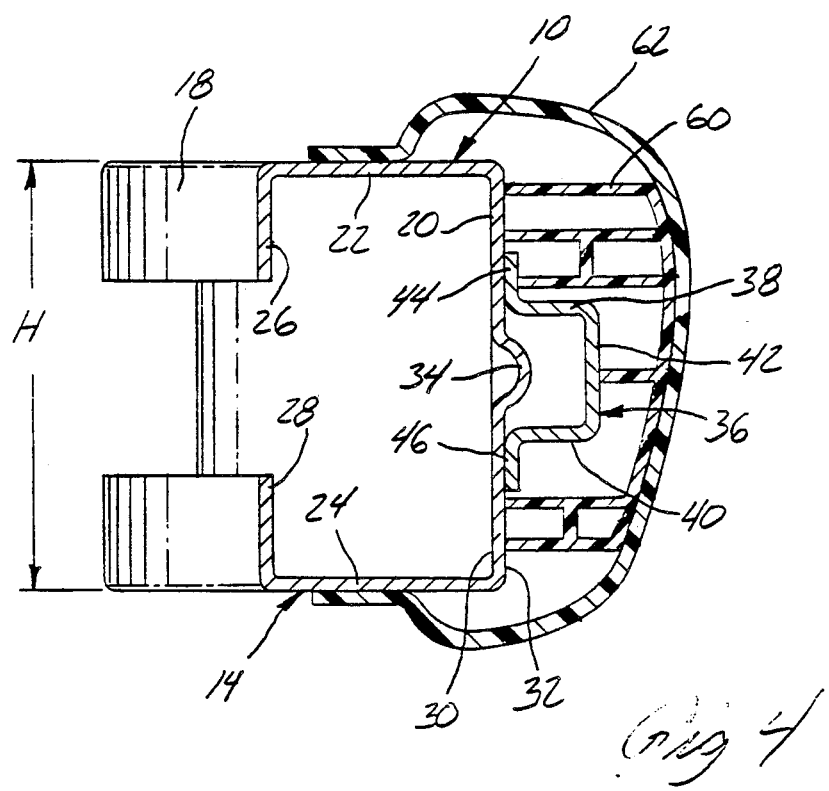
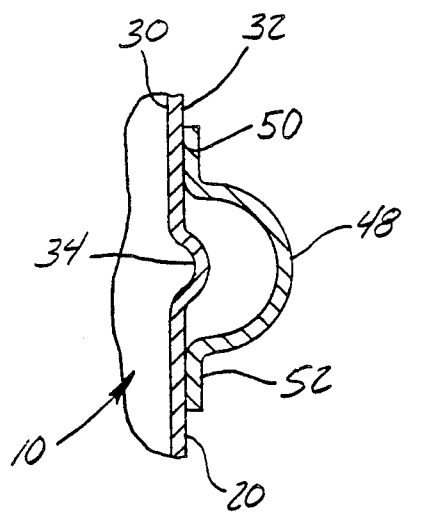
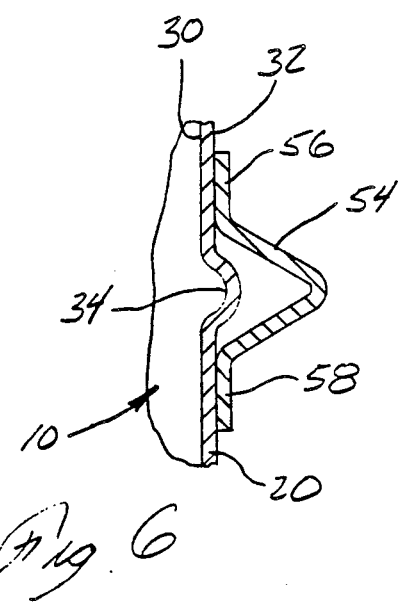

REINFORCED IMPACT BAR FOR A BUMPER ASSEMBLY

BACKGROUND OF THE INVENTION

1. Field of the Invention

The present invention relates generally to a bumper assembly for a vehicle and, in particular, is concerned with a reinforced impact bar for a soft bumper assembly.

2. Description of the Related Art

Soft bumper systems for both front and rear ends of vehicles are well-known. Generally, an impact bar is mounted to the vehicle support structure with fasteners or other suitable means. Impact bars are designed to resist deformation during impact, and reduce damage to the vehicle body and safety-related items. Oftentimes, an energy-absorbing medium, e.g., foam or cellular units, is mounted on the outer face of an impact bar to absorb energy imparted by a collision. A fascia, formed from a pliable material, is fitted over the energy-absorbing medium to provide an attractive outer surface of the bumper system.

The art continues to seek improvements. It is desirable to increase the strength and impact-resistance of the impact bar without substantially increasing its weight. Furthermore, it is desirable to provide a reinforced impact bar which is economical to manufacture and adaptable with conventional bumper assemblies.

SUMMARY OF THE INVENTION

The present invention includes a bumper assembly for a vehicle. A reinforced impact bar resists deformation and compression kinking, particularly during an impact with a vertical pole. The reinforced impact bar reduces the mass otherwise required for conventional impact bar constructions, thereby improving the fuel efficiency of the vehicle. The present impact bar is economical to manufacture and can be utilized with conventional bumper assemblies.

In a preferred embodiment, the present invention includes a bumper assembly for a vehicle. An elongated impact bar is mounted on the vehicle and has inner and outer surfaces. A rib, integrally formed at a central portion of the impact bar, projects outwardly from the outer surface and extends a substantial portion of the length of the impact bar. A reinforcing member is mounted on the outer surface of the impact bar and covers a substantial portion of the length of the rib. An energy-absorbing medium is mounted on the outer surface of the impact bar and covers a substantial portion of the length of the rib. A fascia is attached to the vehicle and covers the energy-absorbing medium.

BRIEF DESCRIPTION OF THE DRAWINGS

FIG. 1 is a perspective view of the present impact bar assembly mounted on a schematically illustrated vehicle wherein a fascia and energy-absorbing medium have been removed for purposes of clarity of illustration.

FIG. 2 is a partial top view of the impact bar assembly of FIG. 1 removed from the vehicle, illustrating an integral, outwardly-projecting rib formed in an impact bar and partially covered by an attached reinforcing member.

FIG. 3 is a front view of the impact bar assembly of FIG. 2.

FIG. 4 is a sectional view of the impact bar assembly of FIGS. 1-3 and further illustrating an energy absorbing medium and a fascia mounted on the assembly.

FIG. 5 is a sectional view of a second embodiment of the reinforcing member having a semicircular cross section mounted on the present, partially illustrated impact bar.

FIG. 6 is a sectional view of a third embodiment of the reinforcing member having a V-shaped cross section mounted on the present, partially illustrated impact bar.

DETAILED DESCRIPTION OF THE PREFERRED EMBODIMENTS

A reinforced impact bar assembly indicated generally at 10 is illustrated in FIGS. 1-4. In FIG. 1, the impact bar assembly 10 is mounted on the front end of a schematically illustrated vehicle 12. It is appreciated that the impact bar assembly 10 can be adapted for the rear end of the vehicle 12.

The bumper assembly 10 includes an elongated impact bar indicated generally at 14. The impact bar 14 can be mounted to either the front or rear of the vehicle 12 by any suitable means. For example, fasteners (not illustrated) can be used to mount the impact bar 14 on support structure (not illustrated) of the vehicle 12 in a well-known manner. Preferably, the impact bar 10 spans the width of the vehicle 12 and is constructed from a lightweight, impact-resistant material, e.g., aluminum or an alloy. The ends 16 and 18 of the impact bar 14 can be curved or rounded to follow the contour of the vehicle 12. Only a right portion of the impact bar assembly 10 is illustrated in FIGS. 2 and 3 and it will be appreciated that the opposite end of the impact bar assembly 10 is a mirror image of that shown in FIGS. 2 and 3.

In a preferred embodiment, the impact bar 14 has a cross section as illustrated in FIG. 4. A substantially vertical front wall 20 is formed with a pair of opposite and generally parallel top and bottom walls, 22 and 24, respectively. The top and bottom walls 22 and 24 terminate in respective rear walls 26 and 28. The front wall 20 provides an inner surface 30 facing the vehicle 12 when the impact bar 14 is mounted and an outer or mounting surface 32 facing opposite the vehicle 12. It is appreciated that other shapes and cross sections for the impact bar 14 are within the scope of the present invention.

The impact bar 14 has a predetermined height H (FIG. 4). At the central portion of this height H, preferably at the middle third, an integral rib 34 is formed in the front wall 20. The rib 34 can be formed in any suitable manner so that it projects outwardly from the outer surface 32. Preferably, the rib 34 has a rounded or semicircular cross section and extends a substantial portion of the length of the front wall 20 between the ends 16 and 18. For a typical passenger vehicle, the rib 34 can be formed in the front wall 20 so that it is approximately eighteen inches from the road surface. A rib 34 having a radius of approximately twelve mm has been found acceptable for a front wall height of approximately 125 mm.

A reinforcement member indicated generally at 36 is mounted on the outer surface 32 of the front wall 20 and covers a substantial portion of the length of the rib 34. The reinforcement member is formed from a lightweight, impact-resistant material, preferably aluminum or an alloy. The reinforcement member 36 can be mounted by any suitable means, such as fasteners (not illustrated) or welding. The cross section of the reinforcement 36 member can be formed as illustrated in FIG. 3 with top and bottom walls 38 and 40 approximately perpendicular to a front wall 42. Rear walls 44 and 46 provide a mounting surface adjacent the outer surface 32 of the front wall 20. A reinforcement member 36 having top, bottom and front walls 38, 40 and 42 of approximately 30 mm has been found acceptable for a rib 34 having a radius of approximately 12 mm. Other cross sections and shapes of the reinforcement member 36 are within the scope of the invention, including the semicircular member 48 having rear walls 50 and 52 illustrated in FIG. 5, and the V-shaped member 54 having rear walls 56 and 58 illustrated in FIG. 6.

An energy-absorbing medium 60 can be fitted over the rib 34 and reinforcement member 36 and mounted on the impact bar 14. The energy-absorbing medium 60 can be formed from multi-sectioned energy-absorbing cellular units as described in U.S. Pat. No. 4,275,912, assigned to the assignee of the present invention and hereby incorporated by reference. Suitable fasteners (not illustrated) can be used to mounted the medium 60 on the impact bar 14. Other energy-absorbing means, e.g., foam energy-absorbing material, can be utilized for the impact bar assembly 10.

A fascia 62 is formed and fitted over the energy-absorbing medium 60. The fascia 62 can be secured to the impact bar 14 or to vehicle body panels in any suitable manner.

Upon impact, particularly with a substantial vertical pole, the reinforcement member 36 and rib 34 provide additional strength to the impact bar 14, thereby greatly reducing body damage to the vehicle 12. The impact resistance added by the rib 34 and reinforcement member 36 permit the mass of the impact bar 14 to be reduced, providing a manufacturing cost savings and improving vehicle fuel efficiency.

Both the rib 34 and the reinforcement member 36 project the initial impact surface forward of the neutral axis of the impact bar 14. Each of these elements individually adds impact resistance to an impact bar 14 and can be utilized in combination, as described above. Additionally, each element can be utilized individually to reinforce a conventional impact bar. For example, an impact bar 14 having an integral rib 34 can be utilized in a bumper assembly without a reinforcing member 36. Also, a conventional impact bar without an integral rib 34 can be combined with a reinforcing member 36 in a bumper system.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A bumper assembly for a vehicle, comprising:
    (a) an elongated impact bar having
        (i) an inner surface facing a vehicle,
        (ii) an outer surface facing opposite the vehicle, and
        (iii) a rib, integrally formed at a central portion of the impact bar, projecting outwardly from the outer surface and extending a substantial portion of the length of the impact bar;
    (b) a reinforcing member mounted on the outer surface of the impact bar and covering a substantial portion of the length of the rib;
    (c) energy-absorbing means mounted on the outer surface of the impact bar and covering a substantial portion of the lengths of the reinforcing member and the rib; and
    (d) fascia means attached to the vehicle and covering the energy-absorbing means.

2. The vehicle bumper assembly as specified in claim 1 wherein the energy-absorbing means comprises a multi-sectioned cellular unit.

3. A bumper assembly comprising:
    (a) an elongated impact bar formed from an impact-resistant material having an inner surface and an outer surface;
    (b) rib means, integrally formed on the impact bar, projecting outwardly from the outer surface and extending a substantial portion of the length of the impact bar; and
    (c) impact-resistant reinforcing means mounted on the outer surface of the impact bar and covering a substantial portion of the length of the rib means.

4. The bumper assembly as specified in claim 3 including energy-absorbing means mounted on the outer surface of the impact bar and covering a substantial portion of the lengths of the reinforcing means and rib means.

5. The bumper assembly as specified in claim 4 including fascia means attached to the impact bar and covering the energy-absorbing means.

* * * * *